United States Patent [19]

Parsons

[11] Patent Number: 4,794,810

[45] Date of Patent: Jan. 3, 1989

[54] LINEAR ACTUATOR

[75] Inventor: Bryan N. V. Parsons, Stoney Stanton, England

[73] Assignee: Jaguar Cars Limited, United Kingdom

[21] Appl. No.: 34,336

[22] Filed: Apr. 3, 1987

[30] Foreign Application Priority Data

Apr. 12, 1986 [GB] United Kingdom ............... 8608967

[51] Int. Cl.[4] ........................................... F16H 25/20
[52] U.S. Cl. ............................... 74/424.8 R; 74/89.15
[58] Field of Search ......... 74/89.15, 424.8 R, 424.8 B

[56] References Cited

U.S. PATENT DOCUMENTS

| 2,482,082 | 9/1949 | Wahlberg | 74/424.8 R |
| 3,614,900 | 10/1971 | Wahlberg | 74/424.8 R |
| 3,730,016 | 5/1973 | Miller | 74/424.8 B |
| 3,937,089 | 2/1976 | Gartner | 74/25 |
| 4,322,987 | 4/1982 | Gartner | 74/89.15 |

FOREIGN PATENT DOCUMENTS

| 2129345 | 1/1972 | Fed. Rep. of Germany | 74/424.5 |
| 3309305 | 9/1984 | Fed. Rep. of Germany | 74/424.8 R |
| 59-9351 | 1/1984 | Japan | 74/424.8 R |
| 629993 | 10/1949 | United Kingdom . | |
| 790487 | 2/1958 | United Kingdom . | |
| 1281143 | 7/1972 | United Kingdom . | |
| 2040017 | 8/1980 | United Kingdom | 74/25 |
| 84-4143 | 10/1984 | World Int. Prop. O. | 74/424.8 R |

Primary Examiner—Lawrence Staab
Attorney, Agent, or Firm—Davis, Bujold & Streck

[57] ABSTRACT

A linear actuator has a screw threaded shaft member and an internally screw threaded member, the threadform of the shaft member corresponding to that of the internally screw threaded member but of smaller diameter, whereby the member may be skewed relative to the shaft so that the threads of the members will engage on a diameter smaller than the diameter of the member, means being provided to rotate one of the members, the other member being mounted so that it is freely rotatable.

15 Claims, 4 Drawing Sheets

LINEAR ACTUATOR

BACKGROUND TO THE INVENTION

The present invention relates to linear actuators and in particular to a linear actuator of the screw thread type.

Hitherto linear actuators have been provided in which an externally threaded shaft engages an internally threaded member, the velocity ratio, that is the ratio of number of turns of the driven component to the number of pitch lengths of linear travel of the other component of such systems being one. It is possible, by increasing the diameter of the internally threaded member, so that the threads thereon engage the threads of the shaft member at only one point, to provide a linear actuator with an increased velocity ratio. However, because the teeth of the threaded members only engage at one point, the load carrying capacity of such actuators are significantly reduced. Furthermore, loading of the members is non-symmetrical and in order to accommodate these non-symmetrical loads, the complexity of construction of the actuator is increased. For example, with such actuators, it is normal to utilise a plurality of internally threaded members arranged to engage the shaft member at angularly spaced locations.

SUMMARY OF THE INVENTION

According to one aspect of the present invention, a linear actuator comprises a screw threaded shaft member and an internally screw threaded member, the threadform of the shaft member corresponding to that of the internally threaded member but of smaller diameter, drive means being provided for rotation of one of the members, the other member being mounted so that it is freely rotatable and will rotate with the driven member, means being provided to skew the axis of one member relative to the axis of the other member, so that the screw threads of the members engage at diametrically opposed positions.

In the linear actuator described above, the internally threaded member is mounted symmetrically of the shaft member and will engage the threads of the shaft member on both sides. The load carrying capacity of the actuator is thereby increased and the loads applied to the internally threaded member are symmetrical.

Skewing of the internally threaded member relative to the shaft member will cause the thread on the internally threaded member to engage the thread on the shaft member on a diameter which is smaller then the diameter of the internally threaded member. Consequently, for every revolution of the shaft member, the internally threaded member will rotate by less than one revolution. This relative angular movement between the shaft member and the internally threaded member will cause corresponding relative axial movement which will depend upon the geometry of the screw thread.

The velocity ratio of actuators according to the present invention, will depend on the difference in the diameter of engagement of the threads and the diameter of the internally threaded member and hence the degree of skew between the shaft member and internally threaded member. The velocity ratio of the actuator may consequently be varied by varying the degree of skew, although the invention will cover actuators with fixed velocity ratio, the shaft member and internally threaded member being fixed at a particular degree of skew. The amount by which one member may be skewed relative to the other depends on several parameters, for example the thread depth and pitch, the clearance between the members, the diameter of the shaft member and the axial length of the internally threaded member. The actual shape of the threadform may also be designed to facilitate adjustment of the velocity ratio in this manner.

According to one embodiment of the invention as illustrated in FIG. 1, the threads on the members may have the same nominal diameter, provided that there is sufficient clearance between the threads to permit one member to be skewed with respect to the other to provide the required velocity ratio. The velocity ratio of such systems may be increased to infinity, that is rotation of the driven member will produce no axial movement of the other member, by eliminating the skew so that the threads will make engagement on a diameter equal to the diameter of the internally threaded member. In a typical example, the shaft member has a standard 10 mm metric thread and the internally threaded member has a standard 10 mm metric pitch but diameter 10.5 mm and axial length 10 mm, the resulting actuator having a velocity ratio which may be varied from 20:1 at 3° skew to infinity at 0° skew. In an alternative embodiment as illustrated in FIG. 4, the clearance between the shaft member and internally threaded member may be sufficiently great to permit clearance between the threads when the skew is zero. This will permit disengagement of the threads, so that one member is free to be moved axially relative to the other member when the actuator is not being driven.

Variation in the angle of skew and thus the velocity ratio, may be controlled manually or automatically. For example, for automatic control, the load applied to the actuator may be arranged to reduce the skew, so that as the load increases, the velocity ratio will also increase, thus reducing the load on the driving means.

Reduction in drive achieved by the present invention is as a result of mounting the non-driven component so that it is free to rotate with the driven component. This may be achieved by mounting the non-driven member in a ball or roller bearing. Friction in the bearing may prevent the non-driven member from rotating when no load or only small loads are applied thereto. In such circumstances, the actuator will act as a conventional screw actuator having a velocity ratio of 1:1. This may be used to advantage in some applications, for example a jack, where it is desirable to move the actuator into engagement with a load at fast rate and then continue to lift the load at a slower rate. Alternatively, means may be provided to physically lock the non-driven member, so that the actuator may be selectively controlled to provide a velocity ratio of 1:1 or the higher velocity ratios attainable when the non-driven member is free to rotate. Such locking means may be arranged to be engaged in response to some preset physical condition, for example a predetermined torque value, so that the actuator will change velocity ratio automatically when that condition is reached. Alternatively the non-driven member may be arranged to be freely rotatable in one direction only, so that when the driven member is rotated in one direction the velocity ratio will depend on the skew angle between the members and when rotated in the opposite direction the velocity ratio will reduce to 1:1.

Either the shaft member or the internally threaded member may be fixed axially so that rotation of one of them via the drive means will cause axial movement of the other. The drive means will conveniently be associated with the axially fixed component, but provided provision is made for relative movement, it may be associated with the axially movable component.

BRIEF DESCRIPTION OF THE DRAWINGS

The invention is now described, by way of example only, with reference to the accompanying drawings, in which.

DESCRIPTION OF A PREFERRED EMBODIMENT

Figure 1:
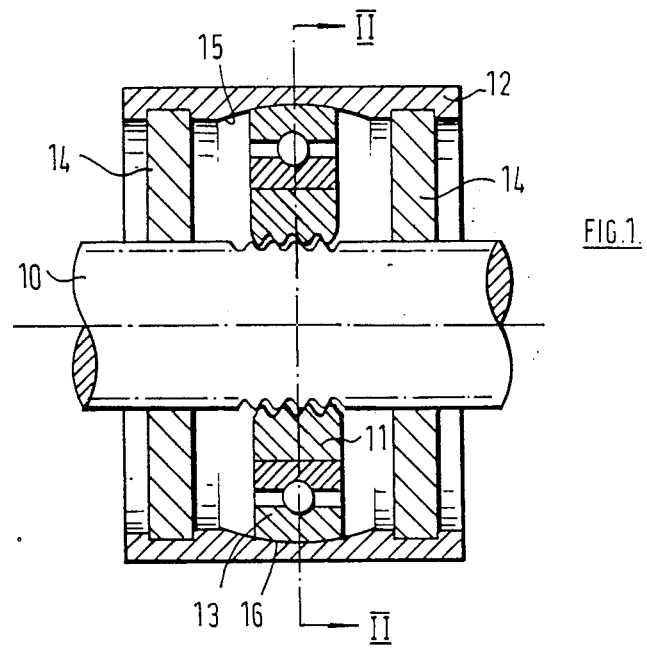
FIG. 1 illustrates in sectional elevation a mechanical linear actuator formed in accordance with the present invention.
Figure 2:
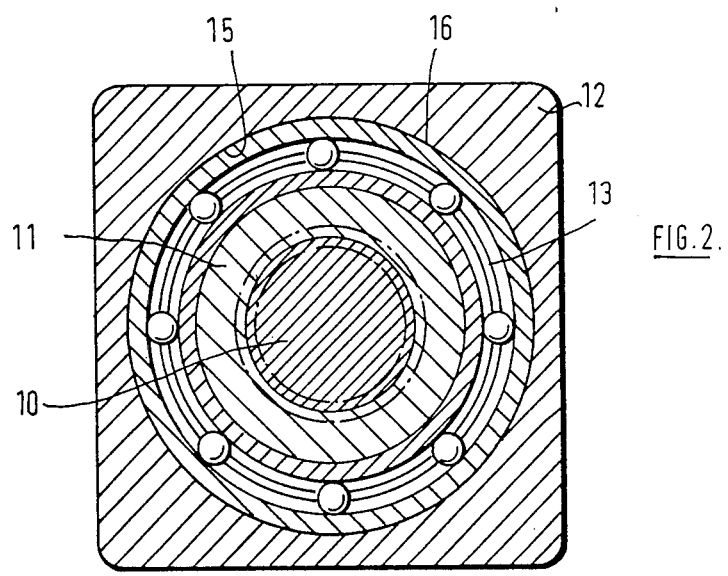
FIG. 2 shows a section along the line II—II shown in FIG. 1.
Figure 3:
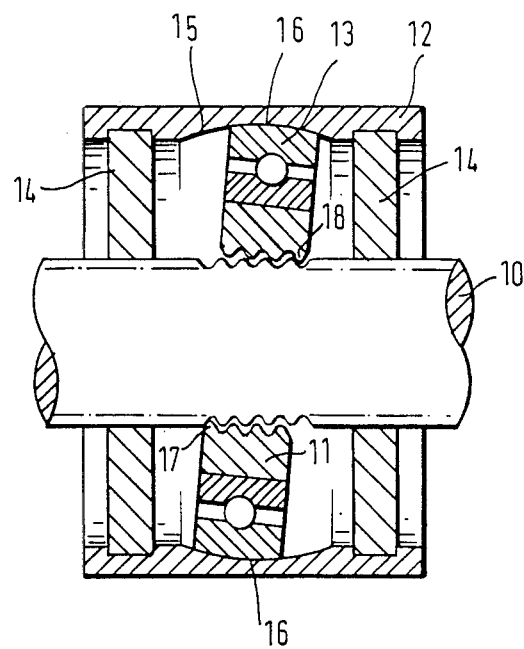
FIG. 3 shows a view similar to FIG. 1 but with one member skewed with respect to the other.

The linear actuator illustrated in FIGS. 1 to 3 comprises a screw threaded shaft 10. An internally threaded member 11 is mounted in cage 12 in a bearing 13. The threadform of the member 11 corresponds to that of the shaft 10 but a clearance is provided therebetween. The shaft 10 is slidingly located through bushes in a pair of plates 14 so that it is concentric with the internally threaded member 11.

Means (not shown) is provided to drive the shaft 10 which is fixed axially in suitable bearings (not shown). The bearing 13 permits the internally threaded member 11 to rotate with the shaft 10.

The bearing 13 is mounted with respect to the cage 12 in a part spherical recess 15, the opposed surface 16 of the outer race of the bearing being of corresponding curvature, so that the bearing 13 and internally threaded member 11 may be skewed relative to the shaft 10.

As illustrated in FIG. 1, the internally threaded member 11 is coaxial with the shaft 10 and consequently the threads of the internally threaded member 11 will engage those of the shaft 10 on a diameter equal to the diameter of the internally threaded member 11. When thus arranged, as the internally threaded member 11 rotates with shaft 10, for each revolution of shaft 10, the member 11 will rotate by one revolution. There will consequently be no relative angular or axial movement between the shaft 10 and member 11.

When however the axis of the member 11 is skewed with respect to the axis of shaft 10 as illustrated in FIG. 3, the threads of member 11 will engage those of shaft 10 at points 17 and 18, on a diameter which is less than the diameter of the member 11. Consequently, as the member 11 rotates with shaft 10, for each revolution of shaft 10, the member 11 will rotate by less than one revolution and the resulting angular movement of shaft 10 and member 11 will cause the member 11 to move axially on the shaft 10. The velocity ratio of the actuator, that is the ratio of the number of turns of shaft 10 to the number of thread pitches moved by member 11 will depend upon the angle of skew, the velocity ratio being lower and hence the rate of movement faster, the greater the angle of skew. Consequently, by making provision for variation of the angle of skew, an actuator of variable velocity ratio is provided.

Figure 4:
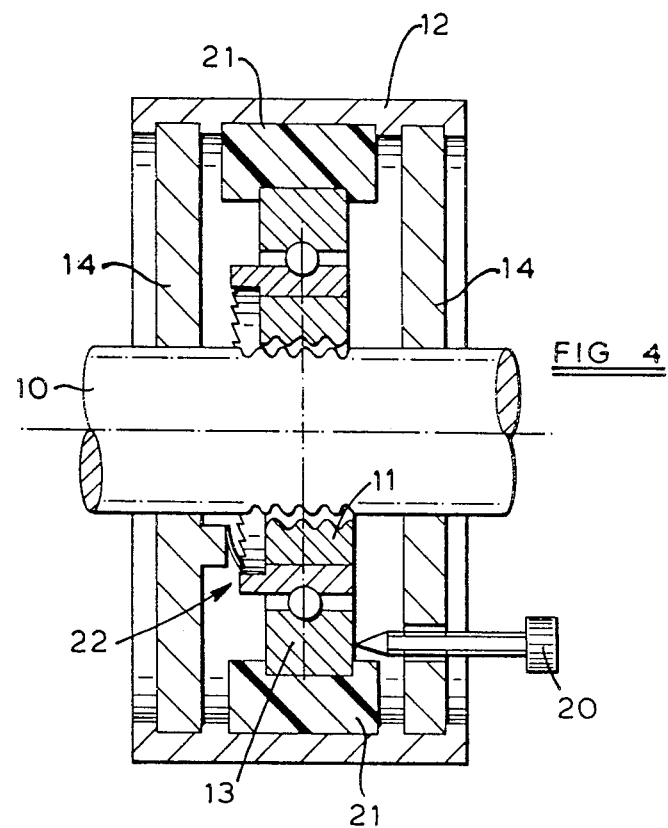
FIG. 4 illustrates a manually adjustable linear actuator formed in accordance with the present invention.
Figure 6:
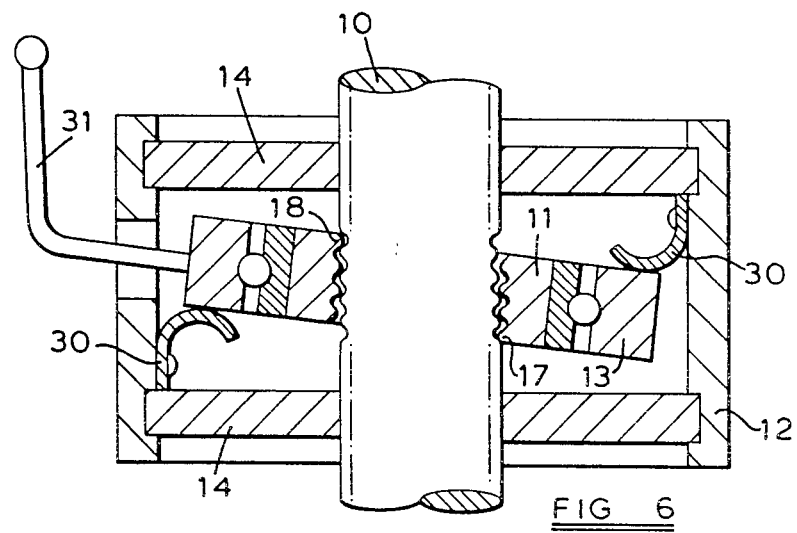
FIG. 6 illustrates an alternative automatically adjustable linear actuator formed in accordance with the present invention.

The amount of skew that is possible will depend upon the dimensions of the shaft 10 and member 11, but will generally be quite small, for example up to 5°. A spherical mounting of the form described above is not essential to provide this amount of skew and the bearing 13 may alternatively be mounted with respect to the cage 12 by resilient means which will permit the required degree of skewing. For example, the outer race of the bearing 13 may be secured to the cage 12 by leaf spring elements 30, as illustrated in FIG. 6 or by the interposition of elastomeric material 21, as illustrated in FIG. 4. In a further alternative, the actual components 15 defining the cage 12 may be in the form of leaf spring elements.

With the linear actuator described above, variation of the velocity ratio may be controlled manually or automatically. For example as illustrated in FIG. 4, screw adjustment means 20 acting between one of the plates 14 and the outer race of bearing 13 may be provided to adjust the angle of skew between the axis of member 11 and shaft 10 and thus the velocity ratio.

Figure 5:
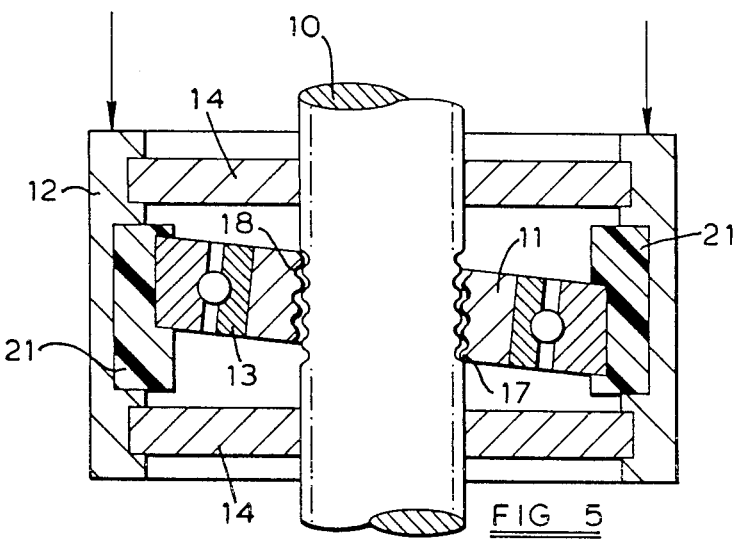
FIG. 5 illustrates a manually adjustable linear actuator formed in accordance with the present invention.

Automatic adjustment of the velocity ratio of the actuator may be achieved in several ways. For example as illustrated in FIG. 5, the member 11 may be resiliently loaded, so that it is skewed to the axis of shaft 10. When a load is then applied symmetrically to the cage 12, reaction between the threads of member 11 and shaft 10 at a points 17 and 18 due this load, will tend to move the threads of member 11 outwardly thus reducing the angle of skew and hence increasing the velocity ratio. The reduction in skew will depend upon the balance between the load applied and the resilient loading of the bearing 13 and consequently the velocity ratio will increase with increasing load, thereby avoiding overloading of the drive means.

A similar arrangement, as illustrated in FIG. 6, may be used, for example, to position a probe 31 with respect to an object so that it imposes a predetermined load on the object. In this case, the probe 31 would be attached to the leading point of the outer race of the resiliently mounted bearing 13. Thus initially when no load is applied to the probe 31, the actuator will move the probe 31 towards the object at a relatively fast rate. As soon as the probe engages the object, it will begin to reduce the skew angle of bearing 13, until when it is at the required load, the skew angle will be zero and axial movement of the member 11 and probe 31 attached thereto will stop.

According to a further embodiment, the cage 12 may be dispensed with and the load applied non-symmetrically directly to the outer race of bearing 13. In this case, the load will provide skewing of member 11 relative to shaft 10 to provide the necessary axial drive.

According to yet a further embodiment of the invention, the actuator may be used as a fixed ratio actuator, the outer race of the bearing 13 being fixed with respect to the cage 12 to give a skew which will provide the velocity ratio required.

All of the actuators described above may be operated at a velocity ratio of 1:1 by preventing rotation of the member 11 with the shaft 10. This may be achieved by physically locking the member 11 against rotation. Alternatively, there may be sufficient friction in the bearing 13 to prevent rotation of member 11 under zero or very light loading. Where however it is desirable to operate the actuator at the relatively high velocity ratios achieved when member 11 rotates with shaft 10, even at zero or very low loads, means (not shown) may be provided to apply a pre-load between the threads, so that there will be sufficient frictional engagement therebetween to overcome any friction in the bearing 13.

As illustrated in FIG. 4 the member 11 may be mounted with respect to the cage 12 by, for example, a ratchet mechanism 22 or one way clutch mechanism, so that it is freely rotatable in one direction only. With this embodiment; when the shaft 10 is rotated in one direction, member 11 will be non-rotatable and the velocity ratio will be 1:1; and when the shaft 10 is rotated in the other direction the member 11 will rotate with it, to give the higher velocity ratios obtainable by the actuators of the present invention.

Various modifications may be made without departing from the invention. For example, while in the above embodiment, it is possible to skew member 11 in both directions provision need only be made for skewing in one direction.

I claim:

1. The linear actuator comprising a screw threaded shaft member and an internally screw threaded member, the threadform of the shaft member corresponding to that of the internally threaded member but of smaller diameter, drive means being provided for rotation of one of the members, the other member being mounted so that it is freely rotatable and will rotate with the driven member, means being provided to skew the axis of one member relative to the axis of the other member, so that the screw threads of the members engage at diametrically opposed positions.

2. A linear actuator according to claim 1 in which the members are skewed with respect to one another, at a fixed angle.

3. A linear actuator according to claim 1 in which means is provided for variation of the angle of skew between the axes of the members.

4. A linear actuator according to claim 3 in which means is provided for manual variation of the angle of skew between the axes of the members.

5. A linear actuator according to claim 3 in which means is provided for automatic variation of the angle of skew between the axes of the members, in response to some physical condition.

6. A linear actuator according to claim 3 in which one member is mounted resiliently with respect to the other member.

7. A linear actuator according to claim 6 in which one member is resiliently pre-loaded to provide a maximum angle of skew between the axes of the members.

8. A linear actuator according to claim 7 in which the axially moveable member is loaded symmetrically, so that reaction between the threads of the members causes a reduction in the angle of skew, the angle of skew thus being a function of the load applied to the axially moveable member.

9. A linear actuator according to claim 7 in which a load is applied to the leading point of the axially moveable member, so that as the load increases, it will tend to reduce the angle of skew.

10. A linear actuator according to claim 3 in which the threads of the members remain in engagement for angles of skew between zero and the maximum permitted by the dimensions of the members.

11. A linear actuator according to claim 3 in which the threads are arranged to move out of engagement as the skew angle approaches zero.

12. A linear actuator according to claim 1 in which the freely rotatable member is rotatable in one direction only.

13. A linear actuator according to claim 1 in which the freely rotatable member is mounted in a bearing, said bearing being mounted in a cage which is located co-axially of the driven member in a manner which will permit it and the freely rotatable member to be skewed with respect to the driven member.

14. A linear actuator according to claim 13 in which the bearing is mounted resiliently with respect to the cage.

15. A linear actuator according to claim 14 in which the bearing is mounted to the cage by means of leaf spring elements or by the interposition of resilient material.

* * * * *